R. HUNTINGTON.
BEARING FINDER.
APPLICATION FILED AUG. 16, 1909.

961,862.

Patented June 21, 1910.

2 SHEETS—SHEET 1.

WITNESSES
A. T. Palmer
B. Varnum Tow.

INVENTOR
Robert Huntington

R. HUNTINGTON.
BEARING FINDER.
APPLICATION FILED AUG. 16, 1909.

961,862. Patented June 21, 1910.
2 SHEETS—SHEET 2.

WITNESSES
A. T. Palmer
B. Darrum How.

INVENTOR
Robert Huntington

UNITED STATES PATENT OFFICE.

ROBERT HUNTINGTON, OF MEDFORD, MASSACHUSETTS, ASSIGNOR, BY MESNE ASSIGNMENTS, OF ONE-HALF TO ARBECAM NAUTICAL INSTRUMENT CO., OF BOSTON, MASSACHUSETTS, A CORPORATION OF MASSACHUSETTS.

BEARING-FINDER.

961,862.   Specification of Letters Patent.   Patented June 21, 1910.

Application filed August 16, 1909. Serial No. 513,178.

*To all whom it may concern:*

Be it known that I, ROBERT HUNTINGTON, a citizen of the United States, and residing at Medford, in the county of Middlesex and State of Massachusetts, have invented certain new and useful Improvements in Bearing-Finders, of which the following is a specification.

This invention relates to bearing finders for use on ships or small boats where conditions do not warrant an expensive and permanently mounted apparatus.

Figures 1, 2:
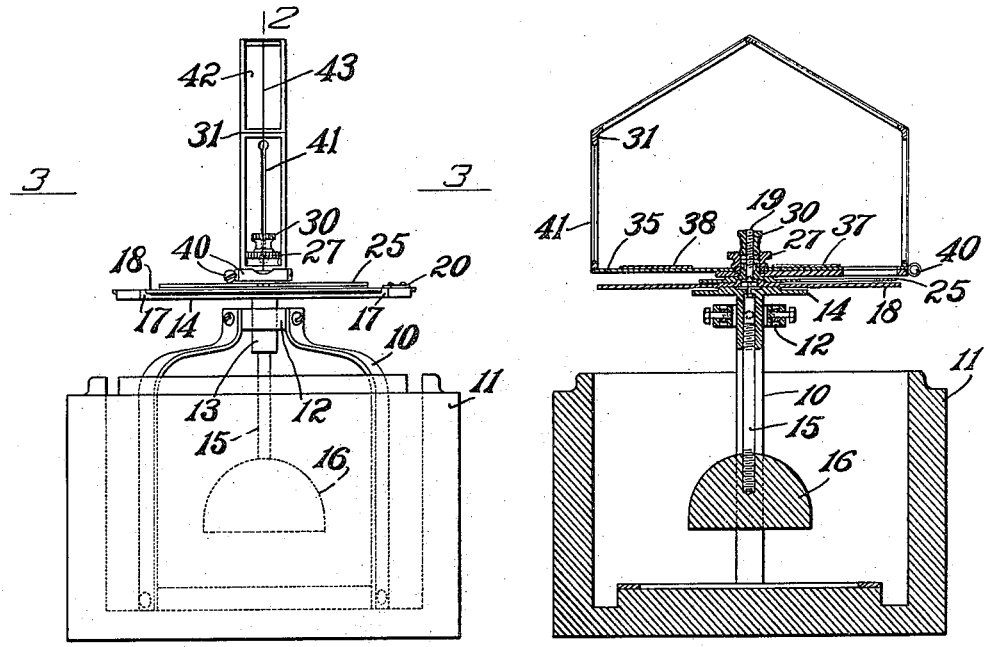
Figure 3:
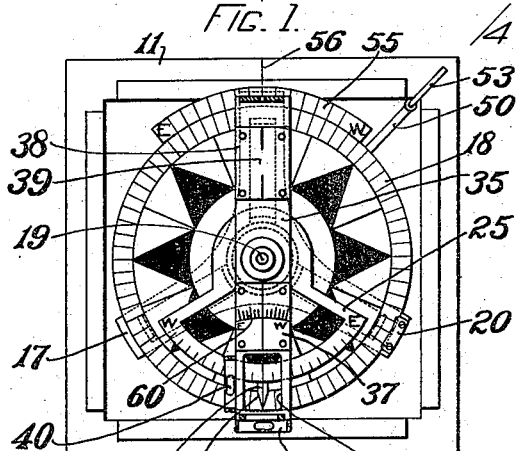
Figure 4:
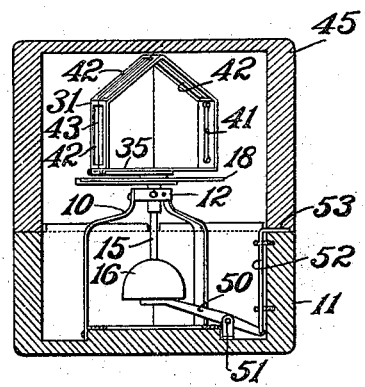
Figure 5:
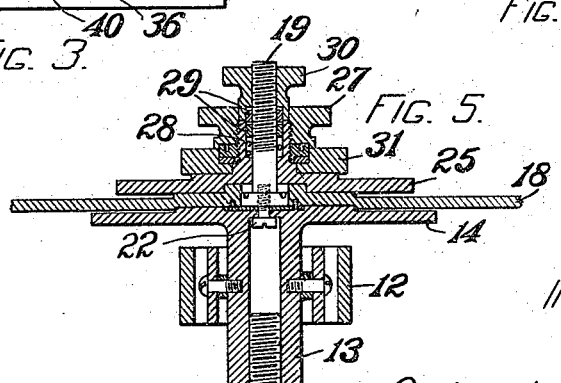

The device is called, in nautical parlance, a pelorus and will be so designated herein.
In addition to the function of bearing finding and deviation correcting, my device has a further use which is possessed by no other instrument known to me, viz.—that of taking observations on elevated heavenly bodies without any shifting of the parts nor limitation in the vertical angle. This is a function, the value of which is greatly enhanced by the simplicity attending its fulfilment, both as to the number of mechanical parts involved and to the ease with which elevated observations may be taken. It is, in effect, a combination of bearing finder, compass, (without polarity) sundial and sextant.
In the accompanying drawings which illustrate one form of my invention, Figure 1 is an end view of my pelorus, cover removed. Fig. 2 is a sectional view of my pelorus taken on a central vertical section and with the sight vanes turned at right angles from the position shown in Figs. 1 and 3. Fig. 3 is a plan view of Fig. 1, sectioned at line 3—3. Fig. 4 is a reduced sectional elevation taken on line 4—4 of Fig. 3, with cover in place. Fig. 5 is an enlarged sectional elevation of the pedestal, similar to that shown in Fig. 2, but at right angles thereto. Figs. 6 to 11 inclusive are diagrams to be later described.
The constructional details will first be described and then reference will be made to some of its many uses.

The frame 10, supported in box 11, carries a universal joint 12 of ordinary construction, through which passes the boss 13 of cross-bar 14. Boss 13 is screw-threaded to receive a downwardly-projecting post 15 which carries a weight 16 adjustably secured at its lower end. Cross-bar 14 is in the form of a three-armed support the outward extremities of which are provided with bearings 17 to receive a graduated compass-plate 18, said compass-plate being further guided by the central pivot 19, the lower end of which is internally screw-threaded to receive the stud 22. Compass-plate 18 is free to rotate in bearings 17 around pivot 19 and may be clamped in any desired position by means of clamping plate 20 upon one of the bearings 17.

Above compass-plate 18 and rotatably mounted upon pivot 19 is a graduated quadrant 25 carrying a pointer 26. The central bearing of this quadrant projects upwardly and is screw-threaded outwardly to receive a clamping nut 27, and is chambered inwardly to receive a spring 28 and washers 29, which latter are threaded on stud 19. Spring 28 tends to keep sufficient pressure upon quadrant 25 to prevent its too free rotation, while clamping nut 30 is adapted to lock it in any desired position.

Above quadrant 25 and upon pivot 19 is rotatably mounted a sighting device 31 which can be clamped in any desired position by clamping nut 27. This sighting device is of peculiar construction and constitutes one of the principal features of my invention. It consists of the flat horizontal bar 35 which has an opening 36 near one end and carries two plates 37 and 38, both of which carry a central radial mark or cut, that on the latter being broken, as at 39, for a purpose to be later described. Leveling tubes 40, attached to bar 35, serve to indicate the proper moment for recording an observation.

At each end of bar 35 are attached the ends of a four sided frame partaking of the nature and function of an arch. One of these sides, 41, is adapted to serve as an eyepiece, while the other three are open, as seen at 42 (Figs. 1 and 4). A wire or thread 43 is attached at the side 41 and is carried centrally over this frame, bisecting the openings in all three sides, and is thence conducted underneath bar 35 and centrally across opening 36, there to serve as in indicator or pointer 29. Underneath weight 16 is a steadying device for preventing oscillation of my pelorus when the cover 45 is in place. It consists of a bar 50, pivoted to box 11 at 51, with its outer end connected to a bent link 52, the turned end 53 of which is engaged by cover 45 (see Fig. 4) so as to thrust the inner end of bar 50 frictionally against the under side of weight 16. An auxiliary graduated sector 55 with E. and W. graduations is mounted on bearing 17 with its zero opposite lubber mark 56 on box 11, which latter may mark the course of the ship.

As an additional feature of invention I prefer to provide one of the plates 37 or 38 with a graduated arc 60 which is concentric with the object end of sighting vanes 31. This arc serves as a deviation finder, as will be later explained.

The functions of the various parts will now be briefly discussed.

The sighting device, which is, in principle, an eye-piece permitting considerable elevation or depression of sight without vertical movement of the mechanism, and a sighting wire which extends both above and below the horizontal plane of said eye-piece, is equally adapted to elevated, depressed or horizontal observations. If it is desired to note the position of the sun, bar 35 is turned until the shadow of wire 43 coincides with the marks on plates 37 and 38, and the space at 39 is then bridged by this shadow. Plates 37 and 38 may be of silver so as to present a more clean-cut shadow. When the zero of the compass-plate 18 coincides with the zero of arc 55 and the lubber mark 56, and the indicator 29 coincides with zero of plate 18, the sighting vanes are in line with the course of the ship.

Figure 11:
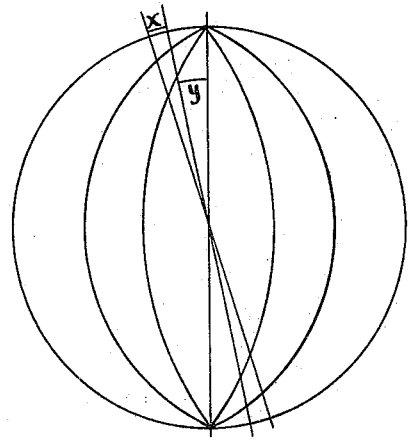

The diagram, Fig. 11, represents a globe in which the vertical axis is the true north. The angle $y$ represents a westerly magnetic variation of the needle, the amount of which is generally obtained from charts. On account of local attraction, the needle may not always agree with this variation and the amount of such deviation, angle $x$, is called the angle of deviation. The angle formed by the algebraic sum of angles $x$ and $y$ is called the compass error.

If it is desired to find the deviation of the compass, proceed as follows:—First, set the way the ship is heading by compass to the variation E. or W. by arc 55 and plate 18. Second, set pointer 26 on quadrant 25 to the sun's true bearing as it reads in the azimuth tables for the latitude, declination and local apparent time and clamp nut 30. Third, turn sight vanes 31 until the shadow from wire 43 cuts center marks on plates 37 and 38 and the deviation is read on quadrant 25, indicating at the same time whether it is E. or W. This operation is illustrated in the diagram, Fig. 6.

Figure 6:
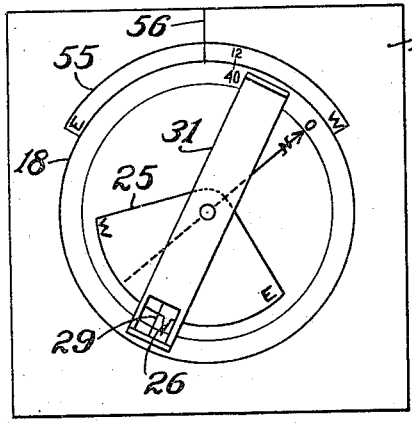

To take a concrete example, suppose that the known variation (angle $y$ of Fig. 11) is 12 degrees W. and the ship is heading N. 40 degrees W. by compass. Set N. 40 degrees W. on disk 18 to the variation 12 degrees W. on arc 55. If there was no compass deviation (angle $x$ of Fig. 11) the north arrow of disk 18 would then point true north. Next, suppose that the known position of the sun, from tables, is S. 30 degrees E. Set pointer 26 of quadrant 25 to S. 30 E. on disk 18 and turn sight vanes 31 until the shadow of wire 43 cast by the sun coincides with the cuts on plates 37 and 38. If there is no deviation, indicator 29 will then coincide with pointer 26. In Fig. 6 we have assumed this deviation to be 5 degrees W. and this amount is noted by indicator 29 on the graduated quadrant 25. Only a portion of these angles are figured in the diagrams as all that is necessary to illustrate is the principle involved. Another way to find the deviation without using the quadrant 25 is to set the disk 18 as indicated in Fig. 6 and point sight vanes 31 toward the sun so that indicator 29 will coincide with S. 30 E. on disk 18. The deviation of 5 degrees W. will be indicated by the shadow of wire 43 falling to the west side of graduated arc 60 by this amount. It is preferable that arc 60 should have as short a radius as possible, as this wire 43 will note the deviation less accurately as the portion casting the indicating part of the shadow becomes more nearly horizontal. The most nearly correct reading will therefore be obtained when the vertical portion of wire 43 casts the desired shadow. Another method of ascertaining the deviation without the aid of arc 55 is to set the magnetic bearing N. 40 W. on disk 18 to lubber mark 56, as in Fig. 7. Then set the sun's position of S. 30 E. by pointer 26 of quadrant 25. Next point sight vanes 31 toward the sun until indicator 29 marks the known variation (12 degrees W.) on quadrant 25 and read the deviation, E. or W., on arc 60.

Figure 7:
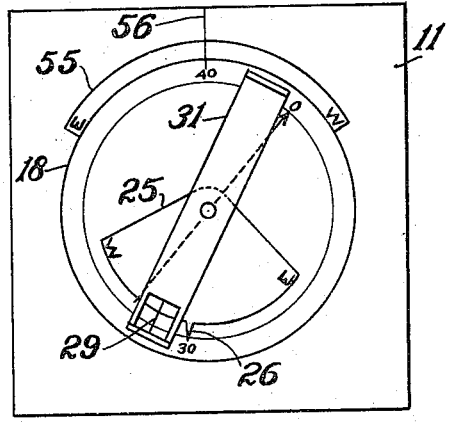
Figure 8:
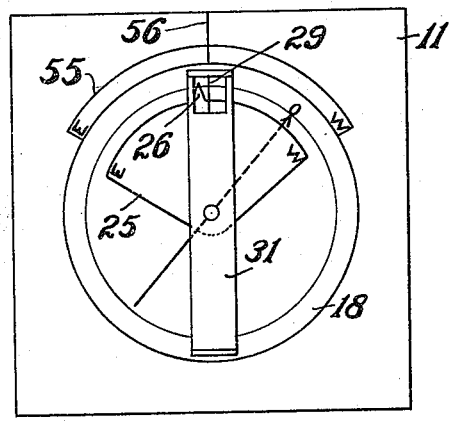
Figure 9:
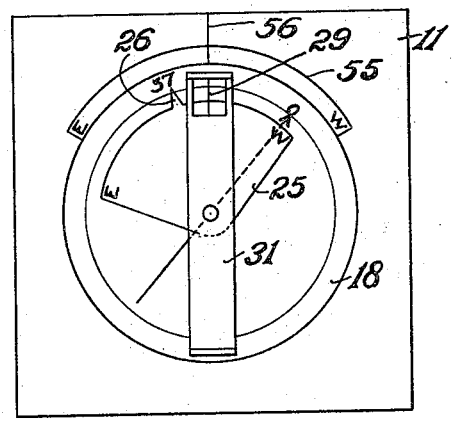
Figure 10:
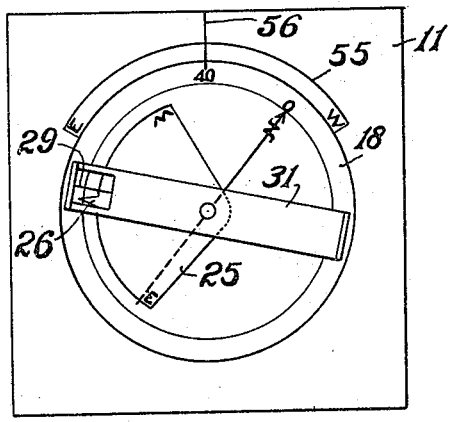

To find the compass error. First, set the ship's course by compass to the lubber mark 56 and the pointer 26 to the sun's true bearing. Turn sight vanes 31 until the shadow of wire 43 cuts center marks on plates 37 and 38 and read the compass error on the quadrant, which tells whether it is E. or W. Fig. 7 represents the result of the foregoing operation for the same concrete example as above. In a manner similar to that above described, the compass error can be found by the aid of arc 60, although in a less satisfactory manner.

To find the magnetic course the ship is making after the deviation has been found. Tighten nut 27 and loosen nut 30 and swing sight vanes 31 and quadrant 25 together until indicator 29 comes to the course the ship is heading and the pointer 26 gives the magnetic course of the ship. See Fig. 8.

To find the true course of the ship. When the compass error has been found, turn quadrant 25 and sight vanes 31 together until indicator 29 cuts the compass course of the ship and pointer 26 gives the true course. See Fig. 9.

To find the magnetic bearing of any object. The ship's head being on lubber mark 56 and indicator 29 to the deviation on quadrant 25, turn sight vanes 31 and quadrant 25 together until the object is sighted through the vanes. The pointer 26 gives the magnetic bearing of the object. See Fig. 10.

To find the compass course to steer by. Deviation or compass error being known, set indicator 29 to same on quadrant 25, turn sight vanes 31 and quadrant 25 together until pointer 26 comes to desired course, either true or magnetic, according as the error or deviation is set. Indicator 29 will give the compass course to steer by.

It is understood that I do not limit myself to the precise form of construction shown in the drawings.

What I claim is:—

1. In a bearing finder, a sighting device comprising a frame with an eye-piece at one end and a sight wire extending from said eye-piece over and across to the object end thereof.

2. In a bearing finder, a sighting device comprising a frame, an eye-piece at one end thereof, a sight wire extending from said eye-piece in the general form of a vertical arc to the object end of said frame, and a plate forming part of said frame, which plate has radial graduations centering at said object end.

3. In a bearing finder, a graduated disk mounted in suitable bearings, a graduated sector adapted to coöperate with said disk as a variation corrector, sighting vanes adapted to rotate about the center of said disk and parallel to the plane thereof, and an indicator attached to said vanes adapted to indicate bearings on said disk, in combination with a horizontal plate rigidly attached to said vanes carrying radial graduations which center at the object end of said vanes.

4. In a bearing finder, a graduated disk mounted in suitable bearings, sighting vanes adapted to rotate about the center of said disk and parallel to the plane thereof, a graduated sector adapted to rotate about the center of said disk and parallel to the plane thereof, said sector being provided with an indicator adapted to coöperate with said disk to record angles, and an indicator attached to said vanes adapted to coöperate with said disk and with said sector to record bearings, in combination with a horizontal plate attached to said vanes, said plate having radial graduations which center at the object end of said vanes.

5. In a bearing finder, a cross-bar supported upon a universal joint, a graduated disk rotatably mounted in said cross-bar, and sighting vanes adapted to rotate about the axis of said disk and parallel to the plane thereof, in combination with a plate attached to said vanes which is provided with radial graduations that center at the object end of said vanes.

6. In a bearing finder, a frame supporting a universal joint, a cross-bar mounted upon said joint, a graduated disk rotatably mounted in said cross-bar and sight vanes adapted to rotate about the axis of said disk and parallel to the plane thereof, in combination with a depending stem attached to said cross-bar, said stem being weighted at its lower end.

7. In a bearing finder, a frame supporting a universal joint, a cross-bar mounted upon said joint, a graduated disk rotatably mounted in said cross-bar, sight vanes adapted to rotate about the axis of said disk and parallel to the plane thereof and a depending stem attached to said cross-bar, said stem carrying a weight at its lower end, in combination with locking means adapted to prevent oscillation of said weight.

8. In a bearing finder, a sighting device supported upon a universal joint, a depending axial stem adapted to oscillate with said sighting device and a weight attached to said stem in combination with a pivoted bar, one end of which is adapted to bear against said weight to frictionally prevent oscillation, while the other end is free to receive the impulse which causes such engagement.

9. In a bearing finder, a containing box supporting a universal joint, sighting vanes supported upon said joint, a cover for said box, a depending axial stem adapted to oscillate with said vanes and a weight at the lower end of said stem, in combination with a pivoted bar having one end free and adapted to frictionally engage said weight to prevent oscillation, while the opposite end is adapted to be automatically operated by the box cover to cause such engagement.

10. In a bearing finder, a containing box supporting a universal joint, a cross-bar mounted upon said joint, a graduated disk rotatably mounted in said cross-bar, a central depending stem attached to said cross-bar and a weight upon said stem, in combination with sighting vanes adapted to rotate about the axis of said disk and parallel to the plane thereof, said vanes comprising an eye-piece and a sighting wire extending from said eye-piece over and across to the object end of said vanes.

In testimony whereof I have affixed my signature in presence of two witnesses.

ROBERT HUNTINGTON.

Witnesses:
ALFRED T. PALMER,
B. DERWEEN FORD.